US006592384B2

(12) United States Patent
Sawayanagi

(10) Patent No.: US 6,592,384 B2
(45) Date of Patent: Jul. 15, 2003

(54) WATERPROOF LOW INSERTION FORCE CONNECTOR

(75) Inventor: Masahiro Sawayanagi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/195,361

(22) Filed: Jul. 16, 2002

(65) Prior Publication Data

US 2003/0017739 A1 Jan. 23, 2003

(30) Foreign Application Priority Data

Jul. 16, 2001 (JP) ....................................... 2001-215087

(51) Int. Cl.[7] ........................ H01R 13/62; H01R 13/52; H01R 13/73; H02B 1/01

(52) U.S. Cl. ........................ 439/157; 439/271; 439/559

(58) Field of Search ................................ 439/157, 271, 439/278, 259, 342, 310, 372, 587, 347, 447, 559

(56) References Cited

U.S. PATENT DOCUMENTS 5,320,544 A * 6/1994 Naoto et al. ................ 439/157
5,474,465 A * 12/1995 Kobayashi .................. 439/278
5,913,691 A * 6/1999 Clark et al. ................. 439/157
6,036,509 A * 3/2000 Maejima ..................... 439/157
6,056,565 A * 5/2000 Sawayanagi et al. ....... 439/157
6,155,849 A * 12/2000 Kodama et al. ............ 439/157
6,293,813 B1 * 9/2001 Johnston et al. ............ 439/157
6,447,312 B1 * 9/2002 Takata ........................ 439/157

* cited by examiner

*Primary Examiner*—Chandrika Prasad
(74) *Attorney, Agent, or Firm*—Armstrong, Westerman & Hattori, LLP

(57) ABSTRACT

A waterproof low insertion force connector includes a lever for fitting a male and a female connector to each other by its rotating operation and an elastic grommet for waterproofing the connectors. The lever has auxiliary flanges and the grommet has an engagement portion to be engaged with the auxiliary flanges when both connectors are completely fit to each other. The connector 3 has a flange 11 formed integrally to its housing 8. When both-connectors are completely fit to each other the auxiliary flanges and the flange are flush with each other, and the engagement portion is engaged with the flange and the auxiliary flanges. The grommet is provided with an interference portion with the grommet at the tip of the lever. In this configuration, incomplete fitting of a waterproof connector and inadvertent coming-off thereof can be prevented.

4 Claims, 3 Drawing Sheets

WATERPROOF LOW INSERTION FORCE CONNECTOR

BACKGROUND OF THE INVENTION

1. Field of the Invention

This invention relates to a waterproof low insertion force connector which fits both male and female connectors to each other by an rotation operation of a lever and includes an elastic grommet to make waterproof of the connectors.

2. Description of the Related Art

FIG. 4 shows an example of an waterproof low insertion force connector.

In a low insertion force connector 41, with a slider 43 slidably attached to a female connector 42 in a direction vertical to a connector fitting direction and a following projection 46 corresponding to a cam groove 45 of the slider 43 attached to a male connector 44, both connectors 42 and 44 are fit to each other with low insertion force by the pushing operation of the slider 43.

The fitting operation by the low insertion force is particularly efficient in the case where there are a large number of terminals in the connectors 42 and 44. In this case, a plurality of male terminals are accommodated in the female connector 42, and the front half tab- or pin-like electric contact of each of the male terminals is projected into a connector fitting chamber 47 at the front half of the female connector 42. The male terminals are crimp-connected to electric wires 48, respectively. The electric wires 48 are bundled by a vinyl tape to constitute a wire harness.

A plurality of female terminals are accommodated in the male connector 44. The female terminals are crimp-connected to electric wires 49, respectively. The electric wires 49 also constitute a wire harness. In this specification, the connector having the connector fitting chamber 47 is referred to as a female connector 42, whereas the connector to be inserted or fit in the connector fitting chamber 47 is referred to as a male connector 44.

The connector housings 51 and 52 of both connectors 42 and 44 and the slider 43 of the female connector 42 are made of synthetic resin. The slider 43 is formed in a shape of a rectangular plate. The slider 43 is provisionally locked by a provisional locking means such as a projection in a state where it has been slightly inserted in the connector fitting chamber 47 from a slit-like opening 50 on the outer wall of the connector housing 51.

A cam groove 45 of the slider 43 is recessed in a longitudinal direction from the tip side of the slider 43. The cam groove 45 is composed of an opening 53 at the starting side opposite to the front opening of the connector fitting chamber 47, a slope 54 sloping in the connector fitting direction from the opening 53 and a short locking straight portion 55 at the terminating side of the slope 54.

The following projection 46 which is formed in a shape of a short cylinder is attached to the inner wall of the male connector housing 52 so as to correspond to the cam groove 45. The male connector housing 52 has a left and right terminal fitting chambers (represented by 52). The following projection 46 is located in the slit-like spacer advancing space between both terminal fitting chambers 52.

The female connector housing 51 has locking arms 56 on the outer wall. The locking arms 56 are engaged with the periphery of the hole 58 of a panel 57 of e.g. a motor vehicle. The panel 57 is sandwiched by the locking arms 56 and the flange 59 at the rear of the female connector housing 51 so that the female connector 42 is locked.

A waterproof rubber grommet 60 is fit over the flange 59 and its front end is in intimate contact with the rear surface of the panel 57. This prevents water from invading the hole 58 of the panel 57. The wire harness (represented by 48) is passed inside the grommet 60. The end on the smaller diameter side of the grommet 60 is fixed to the wire harness 48 by winding of vinyl tape. The female connector 42 including the slider 43, male connector 44 and grommet 60 constitute a waterproof low insertion force connector 41.

As the panel 57, a panel such as a door for a motor vehicle, slide door, etc. is employed. The above low insertion force connector 41 is used to connect the electric appliance or auxiliary machine within the door to a battery power source on the side of a vehicle body.

As seen from FIG. 4, with the female connector 42 secured to the panel 57 and the slider 43 provisionally locked in a state to be projected long in an extracting direction, the connector 44 is initially fit in the connector fitting chamber 47. Thus, the following projection 46 advances into the opening 53 on the starting side of the slider 43. In this state, the slider 43 is strongly pushed into the female connector 42 so that the following projection 46 is pulled along the cam groove 45 in the connector fitting direction. Simultaneously, the male connector 44 is inserted/fit into the female connector 42. The slider 43 is completely locked in the connector housing 51 by the locking means such as the locking arm 61.

However, in the above waterproof low insertion force connector 41, in order to make connector fitting with low insertion force, the gradient of the cam groove 45 of the slider 43 must be set gently and the length thereof must be set long. Therefore, the slider 43 becomes lengthy so that the female connector 42 becomes large in the width direction, and the area required for the female connector 42 to be attached to the panel 57 is increased. Further, while the motor vehicle runs, the locking of the slider 43 is released owing to vibration or shock so that the slider 43 may move in a coming-off direction and the fitting between both connectors 42 and 44 may be loosed, thereby making electric connection incomplete.

The present invention intends to provide a water-proof low insertion force connector which can prevent an increase in the size of a connector and its attaching area due to the presence of a slider, surely fit the connector with low insertion force and prevent inadvertent looseness or coming-off of connector fitting due to vibration or shock of a motor vehicle to assure good electrical connection.

In order to attain the above object, in accordance with this invention, there is provided a waterproof low insertion force connector comprising:

- a lever for fitting a male and a female connector to each other by its rotating operation; and
- an elastic grommet for waterproofing the connectors, wherein the lever has an auxiliary flange and the grommet has an engagement portion to be engaged with the auxiliary flange when both connectors are completely fit to each other.

In accordance with the above configuration, both connectors are fit to each other by the rotating operation of the lever so that the space required to operate the lever is reduced as compared with the conventional slider and force-boosting effect is improved. The auxiliary flange is engaged with the engagement portion of the grommet when both connectors have been completely fit to each other so that the lever is fixed and the rotation of the lever in a returning direction is stopped. Therefore, the inadvertent looseness and coming-off of both connectors is prevented. Where both connectors are incompletely fitted to each other, the auxiliary flange is not fit in the engagement portion of the grommet and causes the grommet to swell outwardly so that the grommet cannot be mounted smoothly. In addition, since the an operator becomes aware of abnormality of the appearance, half-fitting (incomplete fitting) is detected. Further, since the lever is fixed by the elastic grommet, undue force does not act on the lever, the deformation or damage of the lever is prevented and engagement/positioning of the auxiliary flange in the engagement portion can be easily performed.

In a preferred embodiment, one of the connectors has a flange formed integrally to its housing, and when both connectors are completely fit to each other, the auxiliary flange and the flange are flush with each other and the engagement portion is engaged with the flange and the auxiliary flange.

In accordance with this configuration, after both connectors have been completely fit to each other by the rotating operation of the lever, in order to mount the grommet, the engagement portion of the grommet is engaged with the flange of the connector housing. In this case, the auxiliary flange of the lever is also engaged with the engagement portion and the grommet is locked to the connector housing by the flange and the lever is locked to the grommet by the auxiliary flange. In this way, the grommet is positioned on the connector housing with no rattle and hence the lever is precisely locked to the grommet with no shift. The return of the lever is surely stopped. Where both connectors have been incompletely fit to each other, the auxiliary flange of the lever stops smooth mounting of the grommet. Thus, the incomplete fitting of both connectors can be detected.

In a preferred embodiment, the lever is provided with an interference portion with the grommet at the tip of the lever, and the interference portion is projected in a direction vertical to a connector fitting direction when both connectors are not still completely fit to each other, and situated in the connector fitting direction as a result of its rotation when both connectors have been completely fixed.

In accordance with this configuration, when the connectors are incompletely fit to each other, the interference portion at the tip of the lever interferes with the grommet so that the grommet cannot be mounted. Thus, incomplete fitting of the connectors can be detected. When both connectors have been completely fit to each other, the lever is situated in the connector fitting direction as a result of its rotation so that the lever is accommodated with no interference within the grommet.

The above and other objects and features of the invention will be more apparent from the following description taken in conjunction with the accompanying drawings.

DESCRIPTION OF THE PREFERRED EMBODIMENTS

An explanation will be given of an embodiment of this invention.

Figure 1:
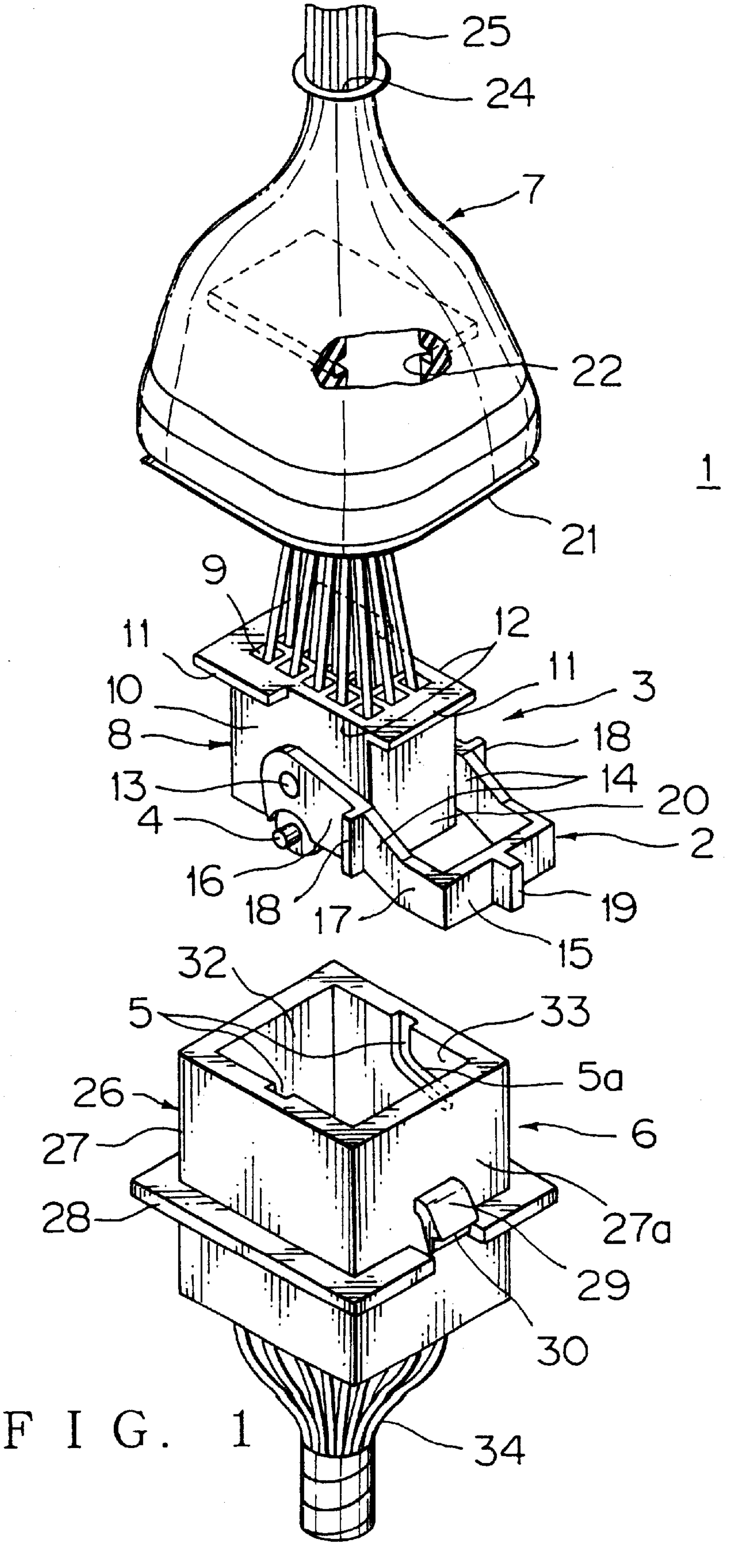
FIG. 1 is an exploded perspective view of an embodiment of a waterproof low insertion force connector according to this invention.
Figure 2:
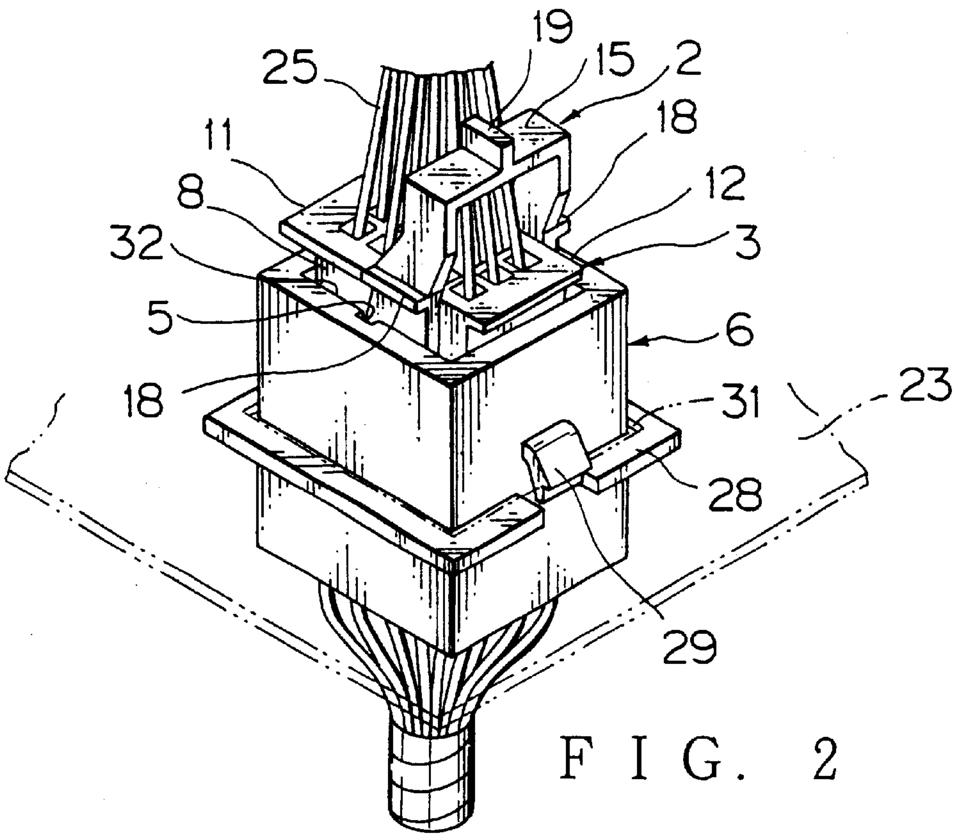
FIG. 2 is a perspective view of the waterproof low insertion force connector in the state where a male connector has been fit in a female connector fixed to a panel by a rotating operation of a lever.
Figure 3:
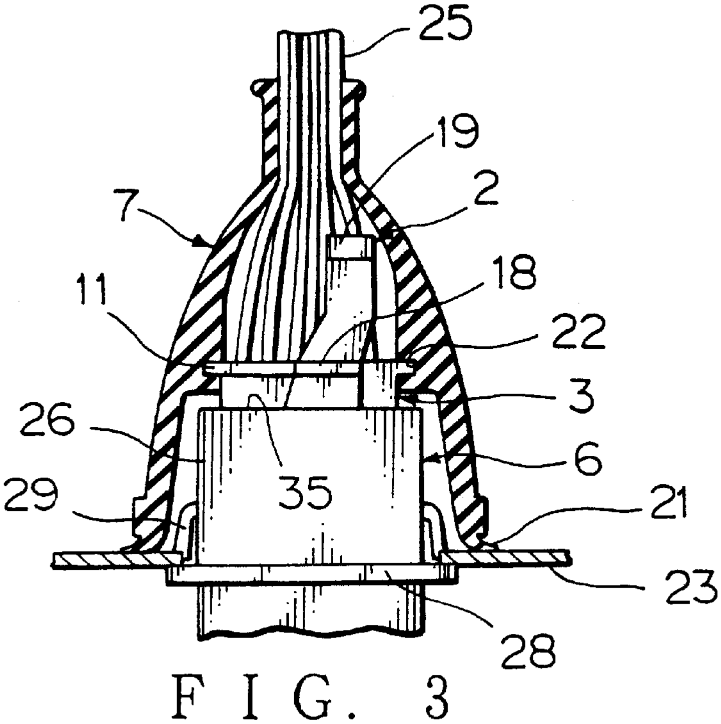
FIG. 3 is a sectional view showing the water proof insertion force connector in the state where a waterproof elastic grommet is mounted at least in a male connector.

FIGS. 1 to 3 shows an embodiment of a waterproof low insertion force connector according to this invention.

As shown in FIG. 1, a waterproof low insertion force connector 1 includes a male connector 3 having a rotary lever 2 for fitting with low insertion force, a female connector 6 having sloped guide grooves 5 which correspond to protrusions 4 for pushing the lever 2 and an elastic rubber grommet 7 which covers at least the male connector 3.

The male connector 3 is composed of a connector housing 8 which is made of synthetic resin, female terminals (not shown) each fixedly inserted in each of terminal chambers 9 in the connector housing 8 and the lever 2 which is made of synthetic resin which is rotatably pivoted onto both left and right side walls 10 of the connector housing 8.

The male connector 3 has a flange 11 integrally formed at the rear end. The flange 11 is recessed in its approximate half on the side from which the lever projects. Recesses 12 recess the flange 11 to the plane flush with each of the left and right side walls 10 of the connector housing 8. The flange 11 also projects from the side of the connector housing 8 opposite to the side from which the lever 2 projects. In this specification, the connector fitting direction is referred to as the front side, whereas the connector removing direction is referred to as the rear side.

The lever 2 is formed in a ⊐-shape by a pair of left and right body segments 14 which are rotatably supported by a shaft 13 at the approximate centers of both side walls 10 of the connector housing 8 and an operation segment 15 which couples the pair of body segments 14 at their tips. The projection 4 for pushing is formed at a position close to the one side of a wide planar area 16 at the base side of each body segment 14. The projections 4 are apart from the shaft 13. Square-plate-like auxiliary flanges 18 are formed in narrow areas 17 successive to the wide areas 16. Each projection 4 projects outwardly and vertically from the surface of the body segment 14.

The auxiliary flange 18 is consistent with the recess 12 of the flange 11 of the male connector housing 7 when the lever has been rotated, and flush with the flange 11.

A square-plate-like projection (interference segment) 19 is protruded from the center of the operation segment 15 of the lever 12. The projection 19 is protruded over a length in contact with the front end face 21 of the elastic grommet 17 at the position of the lever 2 shown in FIG. 1 where the lever 2 is protruded vertically from the one wall of the connector housing 8.

The grommet 7 in this embodiment has a groove (engaging portion) 22 to be mated with the flange 11 and auxiliary flanges 18 in the inner face in the intermediate position in an axial direction. The groove 22 is formed in a square shape so as to correspond to the outer peripheral shape of the flange 11. The grommet 7 may be shortened in the axial direction from the state of FIG. 1 so that the groove 22 is formed inside the front end of the grommet 7.

The grommet 7 shown in FIG. 1 is formed in a length so as to cover both male and female connectors 3 and 6 completely in a state where they are fit to each other. The grommet 7 is equipped with a lip (represented by numeral 21) at the front end. The lip 21 is to be in intimate contact with a panel 23 shown in FIG. 2. A wire harness (composed of a plurality of wires) 25 of the male connector 3 is derived from a hole 24 at the rear end of the grommet 7. In the state shown in FIG. 1, the grommet 7 is movable along the wire harness in the axial direction.

The female connector 6 includes a connector housing 26 which is made of synthetic resin and male terminals (not shown) housed in the connector housing 26. The connector housing 26 has a flange 28 at an intermediate position in the longitudinal direction of an outer peripheral wall 27 and a pair of locking arms 29 which project from both side walls 27*a* in front of the flange 28. The locking arms 29 each has a locking step 30 at the tip. The locking step 30 is oriented outwardly. As seen from FIG. 2, the flange 28 is in contact with the rear surface of e.g. a motor vehicle. The locking arms 29 are engaged with the edges of holes 31 of the panel 23 and the panel 23 is sandwiched by the flange 28 and locking arms 29 so that the female connector 6 is locked.

As shown from FIG. 1, a pair of guide grooves 5 which correspond to the projections 4 for pushing the lever are formed on the inner wall 33 of the connector fitting chamber 32 which is the front half of the female connector housing 26. Each guide groove 5 extends from the front opening of the connector fitting chamber 32 so as to slope in an arc in the projecting direction at the initial position of the lever 2 shown in FIG. 1. The internal width of the guide groove 5 is slightly larger than the outer diameter of the projection 4 so that the projections 4 for pushing can advance smoothly in the guide grooves 5, respectively.

The internal width of the connector fitting chamber 32 in a horizontal direction is slightly larger than the distance between the outer surfaces of the pair of body segments 14 of the lever 2. Therefore, the male connector 8 as well as the lever 2 can be inserted into the connector fitting chamber 32. The female terminals (not shown) within the connector housing 26 are crimp-connected to the electric wires, respectively, which constitute a wire harness 34. The male connector housing 8, lever 2 and male terminals (not shown) constitute the connector 3, whereas the female housing 26 and female terminals (not shown) constitute the connector 6. Both connectors 3 and 6 and elastic grommet 7 constitute a waterproof low insertion force connector 1.

As seen from FIG. 2, when the female connector 6 is inserted in the hole 31 of the panel 23 of the door of a motor vehicle from the rear side of the panel 23, the panel 23 is sandwiched between the locking arm 29 and flange 28 so that the female connector 6 is locked to the panel 23. Next, the male connector 3 is initially fit into the female connector (in the state where the tip of the male connector 3 is slightly inserted into the entrance of the connector fitting chamber 32 but the male and female terminals are not still brought into contact with each other). In this state, the lever 2 is rotated from the horizontal position toward the direction of removing the connector 6 (rearward).

As the operation of rotating the lever 2 proceeds, while the projections 4 for pushing advance into the sloped guide grooves 5 of the female connector 6, they are brought into contact with the sides 5*a* of guide grooves close to the front end of the connector housing 26 so that the male connector 3 is pushed out toward the female connector 6 in the fitting direction. Thus, both connectors 3 and 6 are smoothly fit to each other by low insertion force. When the rotating operation of the lever 2 is completed, the lever 2 is situated vertically upright toward the direction of removing the connector as shown in FIG. 2. The auxiliary flanges 18 of the lever 2 are horizontally flush with the flange 11 within the recesses 12 of the flange 11 of the male connector housing 8. The operation segment 15 of the lever 2 is located substantially in parallel to and in contact or proximity to the wire harness derived from the male connector 3.

In this state, as shown in FIG. 3, while the male and female connectors 3 and 6 are covered with the waterproof grommet 7 which is advanced along the wire harness 25, the internal groove 22 of the grommet 7 is integrally engaged with the flange 11 and auxiliary flange 18. Namely, the flange 11 and auxiliary flange 18 are simultaneously fit in the internal groove 22. The lip 21 at the front end of the grommet 7 is brought into intimate contact with the surface of the panel 23.

Since the auxiliary flanges 11 are fit in the internal groove 22 of the grommet 7, the lever 2 is fixed immovably thereby stopping the return of the rotation of the lever. Thus, the inadvertent return of the lever 2 due to the vibration or shock of the motor vehicle is stopped. Further, inadvertent fitting looseness or coming-off of the connectors 3 and 6 is prevented and reliability of the electric connection between the connectors 3 and 6 is improved.

Further, where the fitting between both connectors 3 and 6 is incomplete, the lever 2 inclines so that the auxiliary flanges 18 and the flange 11 are not flush with each other. Namely, the lever 11 is slightly deviated toward the connector fitting direction. Therefore, when the grommet 7 is mounted as shown in FIG. 3, the internal groove 22 of the grommet 7 interferes with the auxiliary flanges 18 and the corresponding portion of the grommet 7 swells out outwardly so that the grommet 7 cannot be mounted smoothly. In addition, since the appearance is abnormal, an operator becomes aware of abnormality of the connector fitting. Accordingly, incomplete connector fitting can be prevented.

Further, as described above, where the fitting between both connectors 3 and 6 is incomplete, the lever 3 inclines. Therefore, when the grommet 7 is mounted, the projection 19 at the tip of the lever 2 interferes with the front end 21 or inside of the grommet 7 so that the grommet 7 cannot be eventually mounted. This also permits the abnormality of the connector fitting to be detected by an operator. Thus, supply of the product with poor connector fitting can be prevented. As seen from FIG. 2, when both connectors 3 and 6 have been completely fitted to each other, the lever 2 is situated upright in the axial direction so that the grommet 7 can be smoothly mounted without interfering with the lever 2.

In FIG. 3, with the length of the grommet 7 shortened to half and the groove 22 formed circumferentially inside the front end of the grommet 7, the lip 21 at the front end of the grommet 7 can be brought into contact with the front end 35 of the female connector housing 26.

Figure 4:
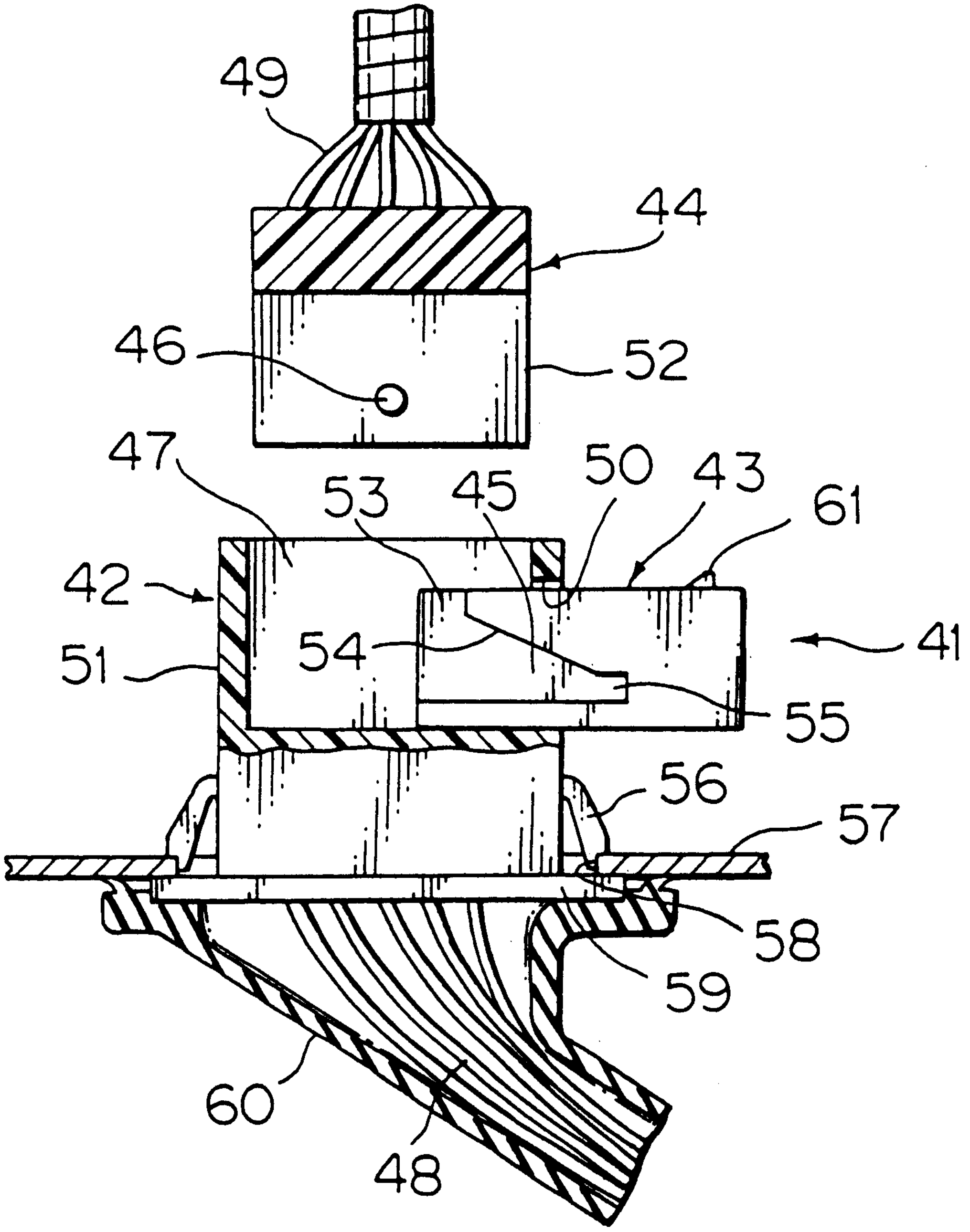
F I G. 4 PRIOR ART
FIG. 4 is a sectional view of a conventional waterproof low insertion force connector.

In accordance with this embodiment, by employing the rotary lever 2 in place of the conventional slider which moves straight (FIG. 4), force boosting effect is increased within a smaller space so that the waterproof low insertion force connector can be miniaturized. Further, as long as both connectors 3 and 6 are not completely fit to each other, the grommet 7 cannot be combined with the flange 11 and auxiliary flanges 18. Therefore, the incomplete rotation operation of the lever 2, i.e. half-fitting between both connectors 3 and 6 can be detected. Further, by combining the grommet 7, the rotation of the lever 2 can be restrained so that the lever 2 is locked and double fit-locking (where the lever 2 is equipped with locking means when the connectors are completely fit) can be realized.

This invention should not be limited to the embodiment described above, but is applicable to e.g. a structure where the one connector 6 is not locked to the panel 23, both connectors 3 and 6 are fit to each other by the operation of the lever 2 and are waterproofed with the grommet 7. Further, in FIG. 1, a lever (2) may be rotatably provided inside the female connector housing 26. In this case, the lever (2) may be rotated toward the male connector 3 so that auxiliary flanges (18) of the lever (2) are flush with the flange 11 of the male connector housing 8. The projections (4) for pushing are provided inside the lever (2). Slits (not shown) for releasing the lever are formed in the female connector housing 26.

A projecting portion composed of e.g. a plurality of projections, which serves as an engaging portion, may be provided in place of the groove 22 of the grommet 7. In this case, the flange 11 and auxiliary flanges 18 are between the plurality of projections. The interfering portion (projection 19) of the lever 2 can be formed in any shape. Only the auxiliary flanges 18 may be engaged with the groove 22 of the grommet 7. In this case, in FIG. 2, the direction of the auxiliary flanges 18 may be not horizontal but vertical.

Incidentally, the contents of Japanese Patent Appln. No. 1-215087 filed on Jul. 16, 2001 are hereby incorporated by reference.

What is claimed is:

1. A waterproof low insertion force connector comprising:

a lever for fitting a male and a female connector to each other by its rotating operation; and an elastic grommet for waterproofing the connectors, wherein said lever has an auxiliary flange and said grommet has an engagement portion to be engaged with the auxiliary flange when both connectors are completely fit to each other.

2. A waterproof low insertion force connector according to claim 1, wherein one of said connectors has a flange formed integrally to its housing, and when both connectors are completely fit to each other, said auxiliary flange and said flange are flush with each other and said engagement portion is engaged with said flange and said auxiliary flange.

3. A waterproof low insertion force connector according to claim 1, wherein said lever is provided with an interference portion with said grommet at the tip of the lever, and said interference portion is projected in a direction vertical to a connector fitting direction when both connectors are not still completely fit to each other, and situated in the connector fitting direction as a result of its rotation when both connectors have been completely fixed.

4. A waterproof low insertion force connector according to claim 2, wherein said lever is provided with an interference portion with said grommet at the tip of the lever, and said interference portion is projected in a direction vertical to a connector fitting direction when both connectors are not still completely fit to each other, and situated in the connector fitting direction as a result of its rotation when both connectors have been completely fixed.

* * * * *